United States Patent [19]

Dien et al.

[11] Patent Number: 4,742,141

[45] Date of Patent: May 3, 1988

[54] IMIDO POLYMER FROM BIS IMIDE AND ALKENYLOXYANILINE

[75] Inventors: Rene Dien, Millery; Michel Rakoutz, Brignais, both of France

[73] Assignee: Rhone-Poulenc Specialites Chimiques, Courbevoie, France

[21] Appl. No.: 929,837

[22] Filed: Nov. 13, 1986

[30] Foreign Application Priority Data

Nov. 13, 1985 [FR] France ................ 85 16971

[51] Int. Cl.$^4$ ............................................. C08F 22/40
[52] U.S. Cl. .................................... 526/262; 528/322
[58] Field of Search ...................... 526/262; 528/322

[56] References Cited

U.S. PATENT DOCUMENTS 4,323,662 4/1982 Oba et al. ............................ 526/262
4,518,754 5/1985 Locatelli et al. .................... 526/262

FOREIGN PATENT DOCUMENTS 46442 1/1974 Japan .
176583 6/1982 Japan .

*Primary Examiner*—Harold D. Anderson
*Attorney, Agent, or Firm*—Burns, Doane, Swecker & Mathis

[57] ABSTRACT

Novel, heat-stable imido polymers, well adopted, e.g., as impregnants, or coating or molding resins, comprise the polymerizates of (a) at least one N,N'-bismaleimide, (b) at least one alkenyloxyaniline, and, optionally, (c) at least one N-(meth)allyloxyphenylmaleimide.

11 Claims, No Drawings

IMIDO POLYMER FROM BIS IMIDE AND ALKENYLOXYANILINE

CROSS-REFERENCE TO RELATED APPLICATION

Our copending application, Ser. No. 929,838, filed concurrently herewith and assigned to the assignee hereof.

BACKGROUND OF THE INVENTION

1. Field of the Invention

The present invention relates to novel heat-stable polymers, and, more especially, to certain novel bisimido copolymers.

2. Description of the Prior Art

There have already been described in this art polymers obtained by reacting an N,N'-bisimide of an unsaturated dicarboxylic acid such as, for example, an N,N'-bismaleimide with a diprimary diamine (French Pat. No. 1,555,564). The amounts of N,N'-bisimide and of diamine are selected such that the ratio:

$$\frac{\text{number of moles of bisimide}}{\text{number of moles of diamine}}$$

is at least equal to 1; it is generally preferred, furthermore, that it should be less than 50. Heat-stable resins are obtained which withstand severe thermal stresses remarkably well.

The abovementioned French patent also indicates that the preparation of these resins may be carried out in bulk, by heating the reactants which have previously been subjected to intimate mixing or, alternatively, in an inert polar diluent, such as dimethylformamide, N-methylpyrrolidone, or dimethylacetamide, it being possible to employ this latter process when, for example, ultimate application of the polymer mandates use of a solution thereof.

Finally, it is mentioned that for many uses it is advantageous to carry out the polymerization in two steps; in a first stage, a prepolymer is prepared by heating the intimate admixture of the two reactants to a temperature on the order of 100° C. to 250° C. The prepolymer obtained may be used in the form of a solution, suspension, powder, or, alternatively, it may also be shaped by merely being cast hot. In a second stage, the curing of the prepolymer may be effected by heating same to temperatures on the order of 350° C., under pressure if desired.

SUMMARY OF THE INVENTION

A major object of the present invention is the provision of novel imido copolymers comprising the polymerizate of:

(a) at least one N,N'-bisimide having the formula:

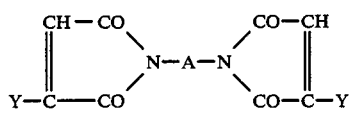

in which the symbol Y denotes H, CH$_3$ or Cl; the symbol A denotes a divalent radical selected from among cyclohexylenes, phenylenes, 4-methyl-1,3-phenylene, 2-methyl-1,3-phenylene, 5-methyl-1,3-phenylene, 2,5-diethyl-3-methyl-1,4-phenylene and the radicals of the formula:

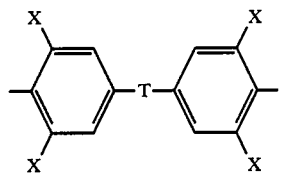

in which T denotes a single valency bond or a group;

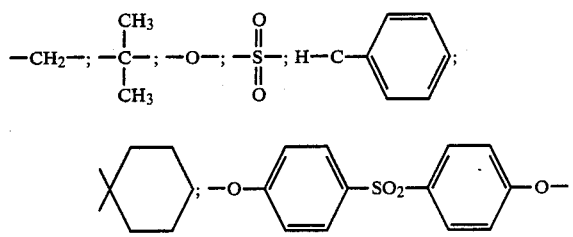

and X denotes a hydrogen atom or a methyl, ethyl or isopropyl radical;

(b) at least one alkenyloxyaniline of the formula:

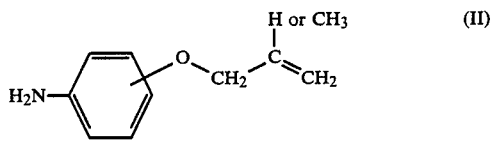

in which the allyloxy or methallyloxy radical is in an ortho-, meta- or para-position with respect to the benzene ring carbon atom bonded to the nitrogen atom; and, if desired, (c) at least one copolymerizable unsaturated comonomer of the formula:

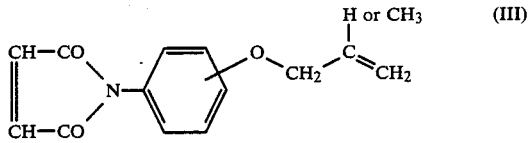

in which the allyloxy or methallyloxy radical is in an ortho-, meta- or para-position with respect to the benzene ring carbon atom bonded to the nitrogen atom.

DETAILED DESCRIPTION OF THE PREFERRED EMBODIMENTS OF THE INVENTION

More particularly according to the present invention, exemplary of the bisimides of the formula (I), representative are, in particular:

N,N'-meta-phenylenebismaleimide,
N,N'-para-phenylenebismaleimide,
N,N'-4,4'-diphenylmethanebismaleimide,
N,N'-4,4'-diphenyl ether bismaleimide,
N,N'-4,4'-diphenyl sulfone bismaleimide,
N,N'1,4-cyclohexylenebismaleimide,
N,N'-4,4'-diphenyl-1,1-cyclohexanebismaleimide,
N,N'-4,4'-diphenyl-2,2-propanebismaleimide,
N,N'-4,4'-triphenylmethanebismaleimide,
N,N'-2-methyl-1,3-phenylenebismaleimide, N,N'-4-methyl-1,3-phenylenebismaleimide,
N,N'-5-methyl-1,3-phenylenebismaleimide.

These bismaleimides may be prepared according to the processes described in U.S. Pat. No. 3,018,290 and British Pat. No. 1,137,290. N,N'-4,4'-diphenylmethanebismaleimide is preferably used according to the present invention, whether alone or admixed with N,N'-2-methyl-1,3-phenylenebismaleimide, N,N'-4-methyl-1,3-phenylenebismaleimide or N,N'-5-methyl-1,3-phenylenebismaleimide.

Exemplary of the amine reactants (b), representative are, in particular:
2-allyloxyaniline,
3-allyloxyaniline,
4-allyloxyaniline,
2-methallyloxyaniline,
3-methylallyloxyaniline,
4-methallyloxyaniline,
and mixtures thereof.

These compounds may be prepared according to the procedures described in the following references: *Journal of American Chemical Society*, 70, pages 592 to 594 (1948); *Chemical Abstracts*, 51, 4423 c (1957); *Journal of American Chemical Society*, 44, pages 1741 to 1744 (1922); *Bulletin de La Societe Chimique de France*, pages 2154 to 2157 (1962).

Insofar as the copolymerizable unsaturated comonomer (c) of the formula (III) is concerned, the following compounds are representative:
N-(2-allyloxyphenyl)maleimide,
N-(3-allyloxyphenyl)maleimide,
N-(4-allyloxyphenyl)maleimide,
N-(2-methallyloxyphenyl)maleimide,
N-(3-methallyloxyphenyl)maleimide,
N-(4-methallyloxyphenyl)maleimide,
and mixtures thereof.

The maleimides of the formula (III) are novel compounds which can be prepared, in particular, from aminophenols (ortho-, meta- or para-) using the Claisen reaction.

For example, aminophenol, the amino group of which is first blocked by reaction with acetic anhydride to form acetamidophenol, may be reacted, depending upon the particular circumstances, with an allyl halide (typically the bromide) or with a methallyl halide in solution in acetone and in the presence of dipotassium carbonate. The amino group is then regenerated by hydrolysis.

The corresponding maleimide is then prepared in conventional manner by reacting the allyloxyaniline or the methallyloxyaniline previously obtained with maleic anhydride, in solution, in the presence of acetic anhydride, triethylamine and a nickel salt (in particular, nickel acetate).

N-(allyloxyphenyl)maleimide or N-(methallyloxyphenyl)maleimide is thus prepared.

N-(4-allyloxyphenyl)maleimide is a solid, mustard-yellow in color, having a melting point of approximately 103° C.

Its NMR analysis is consistent with the following structure:

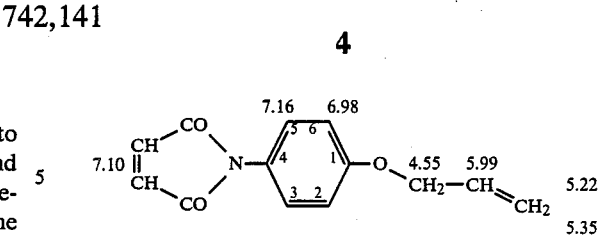

$^1$H-NMR; solvent: DMSO-d$_6$; reference: hexamethyldisiloxane (HMDS)
δ7.16 (2H, m): H3,5;
δ7.10 (2H, s): maleimido;
δ6.98 (2H, m): H2,6;
δ5.99 (1H, m): —CH=;
δ5.35 and 5.22 (2H, dd): =CH$_2$;
δ4.55 (2H, d): OCH$_2$.

N-(3-allyloxyphenyl)maleimide is a viscous orange-yellow liquid which crystallizes slowly at ambient temperature and which boils at approximately 150° C. at a pressure of 20 Pa.

Its NMR analysis is consistent with the following structure:

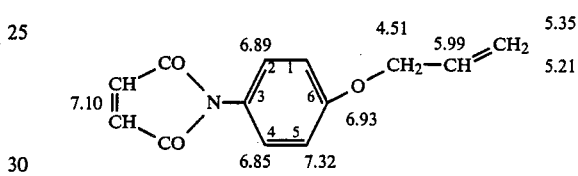

$^1$H-NMR; solvent: DMSO-d$_6$; reference: HMDS
δ6.85, 6.89 and 6.93 (3H, m): H4, H2 and H6;
δ7.10 (2H, s): maleimido;
δ7.32 (1H, t): H5;
δ5.99 (1H, m): —CH=;
δ5.35 and 5.21 (2H, dd): =CH$_2$;
δ4.51 (2H, d): OCH$_2$.

N-(2-allyloxyphenyl)maleimide is a light-yellow crystalline solid with a melting point of approximately 82° C. and a boiling point of 148° C. to 155° C. at a pressure of 20 Pa.

Its NMR analysis is consistent with the following structure:

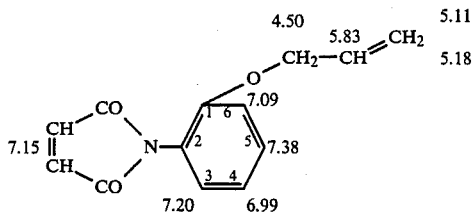

$^1$H-NMR; solvent: DMSO-d$_6$; reference: HMDS
δ7.38 (1H, dt): H5;
δ7.20 (1H, dd): H3;
δ7.15 (2H, s): maleimido;
δ7.09 (1H, dd): H6;
δ6.99 (1H, dt): H4;
δ5.83 (1H, m): —CH=;
δ5.18 and 5.11 (2H, dd): =CH$_2$;
δ4.50 (2H, d): OCH$_2$.

N-(4-methallyloxyphenyl)maleimide is a beige-colored solid having a melting point of 64° C.

Its NMR analysis is consistent with the following structure:

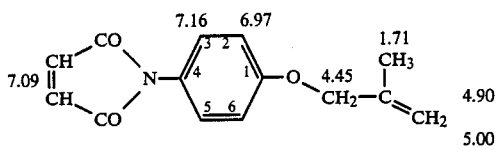

$^1$H-NMR: solvent: DMSO-d$_6$; reference: HMDS
δ7.16 (2H, d): H3,5;
δ7.09 (2H, s): maleimido;
δ6.97 (2H, d): H2,6;
δ4.90 and 5.00 (1H, s): CH$_2$=;
δ4.45 (2H, s): OCH$_2$;
δ1.71 (3H, s): CH$_3$.

N-(3-methallyloxyphenyl)maleimide is a beige-colored solid having a melting point of 39° C.

Its NMR analysis is consistent with the following structure:

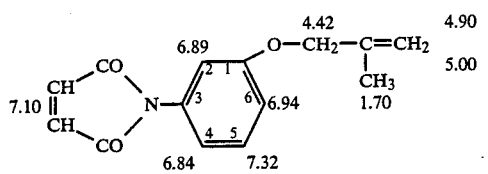

$^1$H-NMR; solvent: DMSO d$_6$; reference: HMDS
δ7.32 (1H, t): H5;
δ7.10 (2H, s): maleimido;
δ6.94 (1H, d): H6;
δ6.89 (1H, s): H2;
δ6.84 (1H, d): H4;
δ4.90 and 5.00 (1H, l): CH$_2$=;
δ4.42 (2H, s): OCH$_2$;
δ1.70 (3H, s): CH$_3$.

N-(2-methallyloxyphenyl)maleimide is a beige-colored solid having a melting point of 96° C.

Its NMR analysis is consistent with the following structure:

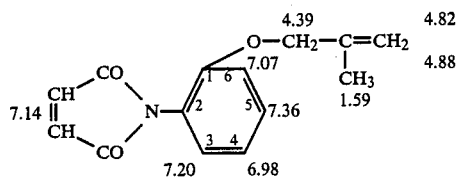

$^1$H-NMR; solvent: DMSO d$_6$; reference: HMDS
δ7.36 (1H, t): H5;
δ7.20 (1H, d): H3;
δ7.14 (2H, s): maleimido;
δ7.07 (1H, d): H6;
δ6.98 (1H, t): H4;
δ4.82 and 4.88 (1H, s): CH$_2$=;
δ4.39 (2H, s): OCH$_2$;
δ1.59 (3H, s): CH$_3$.

With regard to the polymers obtained, according to French Pat. No. 1,555,564, by heating an N,N'-bisimide and a diamine, the replacement of the diamine by an amine reactant such as (b):
when using, furthermore, reactant proportions determined such that the ratio r$_1$:

$$\frac{\text{number of imide groups}}{\text{number of NH}_2 \text{ groups}}$$

is of the same order as that (ratio r$_2$) employed to produce the bisimide/diamine polymer taken for comparison, makes it possible to obtain, unexpectedly, thermosetting polymers which, on the one hand, display a much slower change in melt viscosity over the course of time, at a temperature at which the prepolymer has a viscosity which is compatible with ease of use and, of the other hand, provide cured resins having mechanical properties which are equally excellent. The possibility of having available thermosetting polymers whose melt viscosity shows very little change is an advantage which greatly facilitates the use of these polymers, especially in applications requiring injection times of several hours.

The addition of the optional reactant (c) accompanying the bisimide (a) and the amine reactant (b) is a measure which makes it possible to further increase the fluidity of the prepolymers and to improve the wear resistance and the impact strength of molded articles shaped therefrom.

It should be noted that another advantage of the polymers of the present invention, in comparison with the polymers obtained according to the abovementioned prior art, is the absence of free diprimary diamine in the thermosetting polymer which is to be converted, and this is also highly desirable because these are amine compounds, certain of which may be toxic to some degree.

The amounts of N,N'-bisimide(s) (a), of amine reactant (b) and, if desired, of copolymerizable reactant (c) are selected such that the ratio r$_1$:

$$\frac{\text{number of imide groups}}{\text{number of NH}_2 \text{ groups}}$$

is within the range of from 1/1 to 10/1 and preferably from 1.5/1 to 5/1.

Furthermore, the number of imide groups contributed by the copolymerizable reactant (c), when it is indeed employed, represents up to 30% of the total number of imide groups contributed by the reactants (a)+(c) and is preferably in the range of from 10 to 25%.

The polymers according to the invention may be prepared by heating the bisimide(s) (a), the amine reactant (b) and, if desired, the reactant (c), at least until a homogeneous liquid mixture is obtained. The temperature may vary depending on the physical state of the compounds present, but generally ranges from 50° C. to 250° C. It is advantageous to maintain the starting compounds in an intimately mixed form before and during the heating. Depending on the physical properties of the ingredients, this measure may be carried out by using the usual methods for mixing finely divided solids or, alternatively, in producing a suspension of some of the ingredients in one or more other ingredients, in a liquid state.

The preparation of the polymers according to the invention may be also carried out by heating the mixture of the reactants in an organic diluent which is liquid over at least a part of the range 50° C.–250° C. Exemplary of such diluents, representative are, in particular, aromatic hydrocarbons, such as xylenes and toluene, halogenated hydrocarbons, such as chlorobenzenes, and polar solvents, such as dioxane, tetrahydrofuran and dibutyl ether, dimethylformamide, dimethyl sulfoxide, N-methylpyrrolidone, dimethylacetamide, methyl glycol and methyl ethyl ketone. The polymer solutions or suspensions may be employed, as such, for numerous applications; the polymers may also be isolated, for example by filtration, if desired after precipitation by means of an organic diluent which is miscible with the solvent employed. In this respect, a hydrocarbon whose boiling point does not markedly exceed 120° C. may be used to advantage.

It will also be appreciated that the properties of the polymers according to the invention may vary widely, especially depending on the precise nature of the reactants which are used, on the proportions of reactants which are selected and on precise temperature conditions adopted within the aforementioned range. Insofar as the resultant polymers are concerned, these may be hardened or cured polymers which are insoluble in the usual solvents, e.g., those solvents noted in the previous paragraph and which do not exhibit any appreciable softening below the temperature at which they begin to decompose.

However, these polymers may also comprise prepolymers (P) which are soluble in polar organic solvents and have a softening point at a temperature below 200° C. (this softening point generally ranges from 50° to 150° C.). These prepolymers may be obtained in bulk, by heating the mixture of reactants until a homogeneous or pasty product is obtained, at a temperature which generally ranges from 50° to 180° C. for a period of time which may range from a few minutes to several hours, this period being proportionally shorter the higher the temperature which is used. The preparation of the prepolymers may also be carried out in suspension or in solution in a diluent which is liquid over at least a part of the range 50°–200° C.

In the case where the optional reactant (c) is used, it will be appreciated that these prepolymers (P) may also be prepared by forming, from the bisimide(s) (a) and the reactant (c), a prepolymer (PP) which is then reacted with the amine reactant (b). It is also possible to prepare a prepolymer (P'P') beforehand by heating the mixture of amine reactant (b) and of reactant (c), and then reacting it with the bisimide(s) (a) to produce the prepolymer (P). The conditions of temperature and time used for the preparation of the prepolymers (PP) or (P'P') and for their conversion into prepolymers (P) are those indicated earlier in conjunction with the preparation of the prepolymers (P) by directly mixing the reactants (a), (b) and, if desired, (c).

The prepolymers (P) may be employed in the form of a liquid mass, simple casting while hot being sufficient for shaping and producing molded articles. It is also possible, after they have been cooled and ground, to use them in the form of powders which are remarkably well suited for compression molded operations, if desired in the presence of fillers in the form of powders, spheres, granules, fibers or flakes. In the form of suspensions or solutions, the prepolymers (P) may be used for the production of coatings and of preimpregnated intermediate articles whose reinforcement may consist of fibrous materials based on aluminum or zirconium silicate or oxide, carbon, graphite, boron, asbestos or glass. These prepolymers (P) may also be employed for the production of cellular materials after a blowing agent such as, for example, azodicarbonamide, has been added.

In a second stage, the prepolymers (P) may be cured by heating same to temperatures on the order of 300° C., generally from 150° to 250° C.; an additional shaping operation may be carried out during the cure, under vacuum or at a superatmospheric pressure if desired, it also being possible for these operations to be consecutive. The curing may be carried out in the presence of a radical polymerization initiator, such as lauroyl peroxide, azobisisobutyronitrile or an anionic polymerization catalyst, such as diazabicyclooctane.

In the event that the optional reactant (c) is used, it is also within the ambit of the invention to prepare the cured polymers, which are not in the form of prepolymers (P), from an intimate mixture of prepolymer (PP) and of amine reactant (b) or an intimate mixture of prepolymer (P'P') and of bisimide(s) (a) which are heated in bulk under the conditions described above.

The polymers according to the invention are of interest to those sectors of industry which require materials having good mechanical and electrical properties, together with a high degree of chemical inertness at temperatures of from 200° to 300° C. As specific examples, they are suitable for the manufacture of plate or tubular insulators for electrical transformers, printed circuit boards, pinions, rings, and the like. These polymers are more particularly suitable for use by injection into compact reinforcements consisting of inorganic or organic fibers plaited in several directions. This method requires very long injection times because of the compactness of the reinforcements and thus mandates a fluid polymer to ensure good penetration into the reinforcement and a polymer which has low viscosity that changes but slightly over time, at the temperature selected for carrying out the injection (for example, on the order of 70° C. to 110° C.). These polymers are also highly suitable for filament winding to produce articles of revolution, a technique which is especially used for making components for the automotive and aeronautics industries.

In order to further illustrate the present invention and the advantages thereof, the following specific examples are given, it being understood that same are intended only as illustrative and in nowise limitative.

EXAMPLE 1

(1) A glass reactor, fitted with an anchor-type stainless steel stirrer and a side tube enabling volatile products to escape, was preheated in a bath at 130° C.

The following materials were introduced therein, in succession:

(i) 31.9 g (0.2141 mole) of 3-allyloxyaniline, and
(ii) 78.1 g (0.2181 mole) of N,N'-4,4'-diphenylmethanebismaleimide (the ratio $r_1$ was, in this case, equal to 2.04/1).

The reaction mixture was maintained at 130° C. Samples were taken after 30 minutes, 38 minutes, 60 minutes and 120 minutes and each of these samples was used to measure the viscosity (dynamic viscosity) of the prepolymer obtained and to evaluate the change in this viscosity over time at a temperature at which the prepolymer had a viscosity which was compatible with ease of use: the results were found to be as follows:

TABLE 1

| Reaction time at 130° C. | Viscosity measurement temp. | Dynamic viscosity initial | change |
|---|---|---|---|
| 30 min | 70° C. | 22 poises | 44 poises after 45 min at 70° C. |
| 38 min | 70° C. | 34 poises | 54 poises after |

TABLE 1-continued

| Reaction time at 130° C. | Viscosity measurement temp. | Dynamic viscosity initial | change |
|---|---|---|---|
| 60 min | 80° C. | 26.5 poises | 37 poises after 4 hr at 70° C. 3 hr at 80° C. |
| 120 min | 100° C. | 99 poises | 156 poises after 3 hr at 100° C. |

It will be seen that, in general, the viscosity showed very little change.

A portion of the reaction mixture corresponding to a reaction time of 36 minutes at 130° C. was isolated and then degassed for 2 minutes at a reduced pressure at 1300 Pa, and was finally cast into a mold preheated at 130° C. in order to prepare prepolymer plaques 140×100×4 mm in size. The plaques obtained were subjected to the following cure cycle:
(a) 30 minutes between 130° C. and 160° C. (gradual heating),
(b) then 2 hours at 160° C.,
(c) then 20 minutes between 160° C. and 200° C. (gradual heating),
(d) then 2 hours at 200° C.,
(e) then 30 minutes between 200° C. and 250° C. (gradual heating),
(f) then 15 hours at 250° C.,
(g) then 1 hour between 250° C. and 100° C. (gradual cooling).

After demolding, the plaques based on cured polymer were cut to produce specimens 30×7×4 mm in size which were used to measure the flexural strength D (Sf) and modulus (Mf) at 20° C. and at 250° C. (ASTM standard D 790-63; distance between supports: 25.4 mm):

| at 20° C. | Sf = 192 MPa |
| | Mf = 3,240 MPa |
| at 250° C. | Sf = 88.5 MPa |
| | Mf = 1,750 MPa |

(2) By way of a comparative test (test A), the operations described above were repeated, but this time using 4,4'-diaminodiphenylmethane instead of allyloxyaniline.

A powder mixture based on the following materials was charged over 4 minutes into the reactor described above, preheated to 160° C.:
(i) 140.9 g (0.3936 mole) of N,N'-4,4'-diphenylmethanebismaleimide, and
(ii) 39.1 g (0.1975 mole of 4,4'-diaminodiphenylmethane (the ratio $r_2$ was, in this case, equal to 1.99/1).

After 10 minutes of stirring at 160° C., including 4 minutes under a reduced pressure of 260 Pa, a prepolymer was obtained, the viscosity characteristics of which were as follows:

TABLE 2

| Viscosity measurement temperature | Dynamic Viscosity initial | change |
|---|---|---|
| 90° C. | 23 poises | 122 poises after 30 min at 90° C. |
| 110° C. | 3 poises | 48 poises after 30 min at 110° C. |
| 120° C. | 3 poises | 126 poises after 30 min at 120° C. |

It will be seen in this case that the viscosity changed very rapidly in the direction of high values.

The prepolymer obtained was then molded, cured and tested as indicated above. It should be noted that the cure cycle was the following:
(a) 40 minutes between 160° C. and 200° C. (gradual heating),
(b) then 2 hours at 200° C.,
(c) then 30 minutes between 200° C. and 250° C. (gradual heating),
(d) then 16 hours at 250° C.,
(e) then 1 hour between 250° C. and 100° C. (gradual cooling).

Flexural results:

| at 20° C. | Sf = 226 MPa |
| | Mf = 2,970 MPa |
| at 250° C. | Sf = 58.5 MPa |
| | Mf = 1,325 MPa |

EXAMPLE 2

The following materials were introduced, in succession, into the reactor used in Example 1, preheated to 130° C.:
(i) 14.55 g (0.0976 mole of 3-allyloxyaniline, and
(ii) 45.45 g (0.1269 mole) of N,N'-4,4'-diphenylmethanebismaleimide (the ratio $r_1$ was, in this case, equal to 2.60/1).

The reaction mixture was maintained in the reactor for 37 minutes, then the prepolymer produced was degassed for 2 minutes at a reduced pressure of 1300 Pa and it was then cast, cured and tested as indicated in Example 1 (paragraph 1).

The prepolymer had an initial viscosity of 67 poises at 70° C.; after 60 minutes at 70° C., the viscosity increased to 97 poises.

Flexural results:

| at 20° C. | Sf = 185 MPa |
| | Mf = 3,180 MPa |
| at 250° C. | Sf = 125 MPa |
| | Mf = 2,440 MPa |

EXAMPLE 3

(1) The following materials were introduced, in succession, into the reactor used in Example 1, preheated to 130° C.:
(i) 15.54 g (0.1043 mole) of 3-allyloxyaniline,
(ii) 37.3 g (0.1042 mole) of N,N'-4,4'-diphenylmethanebismaleimide, and
(iii) 7.14 g (0.0312 mole) of N-(3-allyloxyphenyl)-maleimide (the ratio $r_1$ was, in this case, equal to 2.29/1 and the number of imide groups contributed by N-(3-allyloxyphenyl)maleimide represented 13% of the total number of imide groups contributed by the reactants).

The reaction mixture was maintained in the reactor for 37 minutes, then the prepolymer obtained was degassed for 2 minutes at a reduced pressure of 1300 Pa and it was then cast, cured and tested as indicated in Example 1. It should be noted that the cure cycle in this case was as follows:
(a) 2 hours at 130° C.,
(b) then 25 minutes between 130° C. and 160° C. (gradual heating),
(c) then 1 hour at 160° C., (d) then 35 minutes between 160° C. and 200° C. (gradual heating),
(e) then 1 hour at 220° C.,
(f) then 30 minutes between 200° C. and 250° C. (gradual cooling),
(g) then 15 hours and 30 minutes at 250° C.,
(h) then 1 hour between 250° C. and 100° C. (gradual cooling).

The prepolymer had an initial viscosity of 7.7 poises at 70° C.; after 100 minutes at 70° C., the viscosity increased to 8.1 poises.

Flexural results:

| at 20° C. | Sf = 163 MPa |
| | Mf = 3,365 MPa |
| at 250° C. | Sf = 81.5 MPa |
| | Mf = 1,970 MPa |

(2) Description of the preparation of N-(3-allyloxyphenyl)maleimide:

This compound was prepared from 3-allyloxyaniline, a method for the preparation of which is described in *Chemical Abstracts*, 51, 4423c (1957).

The following materials were introduced simultaneously over 20 minutes, using two dropping funnels, into a glass reactor fitted with a central stirrer, a thermometer d and a reflux condenser, maintained at 50° C. under stirring and through which a gentle flow of nitrogen was passed:
  (i) 498 g of an acetone solution containing 298.0 g of 3-allyloxyaniline,
  (ii) 498 g of an acetone solution containing 225.4 g maleic anhydride,
  (iii) rinsing of each dropping funnel with 20 cm³ of acetone,
  (iv) 326.4 g of acetic anhydride,
  (v) 90.8 g of triethylamine,
  (vi) 3.8 cm³ of aqueous solution containing 0.0528 mole of nickel sulfate per 100 cm³ of solution, and
  (vii) 2698 g of distilled water.

The addition of 2698 g of distilled water to the reaction mixture resulted in the separation of a dark-colored oil, which was extracted with three 250-cm³ portions of ethyl acetate. The organic layers obtained were combined and were dried over sodium sulfate.

After removal of the solvent to dryness under reduced pressure (initially at approximately 3,000 Pa and then at approximately 70 Pa), 464 g of a very dark viscous oil were obtained, containing 0.309 ethylenic double bond per 100 g, determined by titration.

22.77 g of this crude product were taken and 0.2 g of hydroquinone was added to this material. The latter was distilled at 12 Pa in a 50-cm³ reactor fitted with a Vigreux column and a fraction collector.

14.7 g of a fraction which distilled between 150° C. and 155° C. at 20 Pa were collected.

This was an orange-yellow, clear, viscous liquid, the NMR spectrum of which was consistent with the structure of N-(3-allyloxyphenyl)maleimide.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:
1. An imido polymer comprising the polymerizate of:
(a) at least one N,N'-bisimide having the formula:

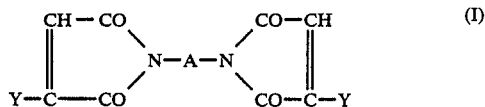

in which Y is H, CH₃ or Cl, A is cyclohexylene, phenylene, 4-methyl-1,3-phenylene, 2-methyl-1,3-phenylene, 5-methyl-1,3-phenylene, 2,5-diethyl-3-methyl-1,4-phenylene, or a radical of the formula:

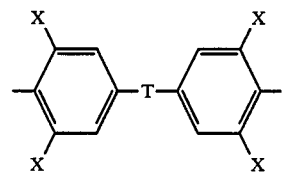

in which T is a single valency bond or T is a group:

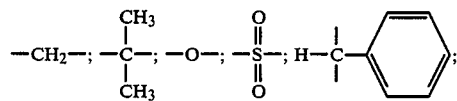

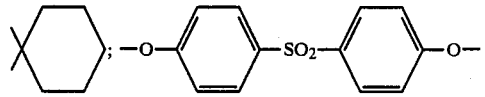

and X is a hydrogen atom or a methyl, ethyl or isopropyl radical; and
(b) at least one alkenyloxyaniline of the formula:

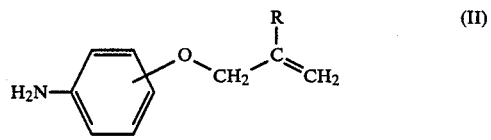

in which the allyloxy or methallyloxy radical is in the ortho-, meta- or para-position relative to the benzene ring carbon atom bonded to the nitrogen atom, and R is H or CH₃.

2. The imido polymer as defined by claim 1, comprising the polymerizate of said comonomers (a) and (b), together with:
(c) at least one copolymerizable unsaturated comonomer having the formula:

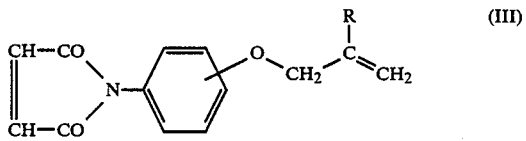

in which the allyloxy or methallyloxy radical is in the ortho-, meta- or para-position relative to the benzene ring carbon atom bonded to the nitrogen atom, and R is H or CH₃.

3. The imido polymer as defined by claim 1, wherein the amounts of N,N'-bisimide(s) (a), of amine reactant (b) and copolymerizable reactant (c) are such that the ratio $r_1$:

$$\frac{\text{number of imide groups}}{\text{number of NH}_2 \text{ groups}}$$

ranges from 1/1 to 10/1, and the number of imide groups contributed by the copolymerizable reactant (c) constitutes up to 30% of the total number of imide groups contributed by the reactants (a)+(c).

4. The imido polymer as defined by claims 1 or 2, in cured state, insoluble, and exhibiting no appreciable softening below the decomposition temperature.

5. The imido polymer as defined by claims 1 or 2, in thermosetting prepolymer state, soluble in polar organic solvents, and having a softening point at a temperature below 200° C.

6. A process for the preparation of the cured imido polymer as defined by claim 4, comprising heating a mixture of said comonomers at a temperature of from 50° to 250° C.

7. The process as defined by claim 6, comprising first heating said mixture of reactants to a temperature of from 50° C. to 180° C. to prepolymerize same, and thence curing the prepolymer which results at a temperature of from 150° C. to 250° C.

8. A process for the preparation of the prepolymer as defined by claim 5, comprising directly heating a mixture of said comonomers at a temperature of from 50° C. to 180° C. until a homogeneous liquid or pasty product is obtained.

9. A shaped article comprising the imido polymer as defined by claims 1 or 2.

10. A shaped article comprising the imido polymer as defined by claim 4.

11. A shaped article comprising the imido polymer as defined by claim 5.

* * * * *